(12) United States Patent
Breault

(10) Patent No.: US 7,063,907 B2
(45) Date of Patent: Jun. 20, 2006

(54) PASSIVE WATER MANAGEMENT SYSTEM FOR A FUEL CELL POWER PLANT

(75) Inventor: Richard D. Breault, North Kingstown, RI (US)

(73) Assignee: UTC Fuel Cells, LLC, South Windsor, CT (US)

( * ) Notice: Subject to any disclaimer, the term of this patent is extended or adjusted under 35 U.S.C. 154(b) by 98 days.

(21) Appl. No.: 10/612,688

(22) Filed: Jul. 2, 2003

(65) Prior Publication Data
US 2005/0003252 A1   Jan. 6, 2005

(51) Int. Cl.
*H01M 8/04* (2006.01)
(52) U.S. Cl. ............................................ 429/26; 429/34
(58) Field of Classification Search ................ 429/26, 429/34, 39
See application file for complete search history.

(56) References Cited

U.S. PATENT DOCUMENTS

| 5,503,944 A * | 4/1996 | Meyer et al. ................. 429/13 |
| 5,547,776 A | 8/1996 | Fletcher et al. |
| 5,773,160 A | 6/1998 | Wilkinson et al. |
| 6,322,915 B1 | 11/2001 | Collins et al. |
| 6,329,090 B1 | 12/2001 | McElroy et al. |
| 6,794,077 B1 * | 9/2004 | Yi et al. ........................ 429/34 |
| 2002/0071981 A1 | 6/2002 | Sano et al. |

* cited by examiner

*Primary Examiner*—Gregg Cantelmo
(74) *Attorney, Agent, or Firm*—Malcolm J. Chisholm, Jr.

(57) ABSTRACT

The invention includes an anode fuel flow field (100) adjacent a fuel cell (12) electrolyte (18) that defines a fuel path (102) between a fuel inlet (108) and a fuel outlet (110) and includes a cooler plate (118) in heat exchange relationship with the anode fuel flow field (100) that defines a coolant path (120) between a coolant inlet (126) and a coolant outlet (128). The fuel path (102) has a width (132) that is about the same as a width (134) of the coolant path (120) where the fuel path (102) and the coolant path (120) are closest to each other, and the fuel path (102) substantially overlies the coolant path (120) to minimize evaporation of water from water management flow fields (20) (22) and/or the electrolyte (18) into the fuel within the fuel path (102).

3 Claims, 2 Drawing Sheets

PASSIVE WATER MANAGEMENT SYSTEM FOR A FUEL CELL POWER PLANT

TECHNICAL FIELD

The present invention relates to fuel cell power plants that are suited for usage in transportation vehicles, portable power plants, or as stationary power plants, and the invention especially relates to a system that passively manages fuel cell product water.

BACKGROUND ART

Fuel cell power plants are well known and are commonly used to produce electrical energy from hydrogen containing reducing fluid fuel and oxygen containing oxidant reactant streams to power electrical apparatus such as power plants and transportation vehicles. In fuel cell power plants of the prior art, it is known that product water generated by fuel cells of the plant is often removed through porous water transport plates into a coolant system, as well as through evaporation and/or entrainment in a cathode exhaust stream. Such a coolant system is also utilized to provide water through the porous water transport plates to humidify fuel and oxidant reactant streams to thereby minimize drying out of proton exchange membrane ("PEM") electrolytes. Porous water transport plates when filled with a liquid also provide gaseous seals to prohibit mixing of the reactant oxidant and fuel streams. Fuel cell power plants having porous water transport plates, however, give rise to water management difficulties related to freezing of water when the plant is operated or shut down in sub-freezing conditions.

An alternative fuel cell power plant is known that utilizes passive water management and reduced free water volume, wherein the coolant system includes a sealed cooler plate so that traditional antifreeze solutions may be utilized to cool fuel cells of the plant. Because the cooler plate is sealed, the antifreeze solution cannot pass out of the plate to poison fuel cell catalysts. As described in commonly owned U.S. patent application Ser. No. 10/036,181, now U.S. Pat. No. 6,794,077 B2, entitled "Passive Water Management Fuel Cell", fuel cell product water may be removed from an operating fuel cell by water management flow fields defined adjacent to anode and cathode reactant flow fields. Such water management flow fields also serve to provide water for humidification of the reactant streams to prohibit drying out of the PEM electrolyte. The water flow fields also provide gaseous seals between cells of a well-known fuel cell stack assembly in the event a sealed cooler plate or solid separator plate is not disposed between each cell of the assembly. It is important that the water management flow fields not dry out, so that reactant streams may not pass out of fuel or oxidant flow fields into the water management flow fields, so that reactant streams do not cross-over the water flow fields to mix together, and so that water is not evaporated out of a PEM electrolyte to humanity dry reactant streams thereby degrading the electrolyte performance. The water management flow fields may be defined as channels or pores within porous layers.

Fuel and oxidant reactant streams passing into a fuel cell may tend to evaporate water out of water management flow fields and the PEM electrolyte adjacent the streams depending upon various factors, including relative humidity of the streams, availability of water, and temperatures of the water management flow fields near the reactant streams, etc. For example, an oxidant stream having a low relative humidity with respect to a temperature of an oxidant inlet of the cell may not dry out a cathode water management flow field because product water being generated by the fuel cell readily replaces water evaporated out of the field into the oxidant stream. However, a fuel stream having a low relative humidity with respect to a temperature of a fuel inlet of the cell may dry out an anode water management flow field, leading to movement of the fuel stream into the water management flow field, to evaporation of water from the PEM electrolyte, and to cross-over of the reactant streams through the anode water management flow field.

Consequently, there is a need for a passive water management system for a fuel cell power plant that provides for humidification of reactant streams, removal of fuel cell product water, minimal free water volume, and that minimizes a risk of drying out of water management flow fields of the plant.

DISCLOSURE OF INVENTION

The invention is a passive water management system for a fuel cell power plant. The system includes at least one fuel cell for generating electrical current from hydrogen containing reducing fluid fuel and oxygen containing oxidant reactant streams. The fuel cell has an anode fuel flow field and a cathode oxidant flow field defined adjacent opposed sides of an electrolyte, and an anode water management flow field defined adjacent the anode fuel flow field. The anode fuel flow field includes at least one fuel path defined between a fuel inlet and a fuel outlet for directing the fuel to flow adjacent to the electrolyte from the fuel inlet through the fuel path to the fuel outlet. A cooler plate is secured in heat exchange relationship with the fuel cell for removing heat from the fuel cell. The cooler plate includes at least one coolant path defined between a coolant inlet and a coolant outlet for directing a cooling fluid to flow from the coolant inlet through the coolant path to the coolant outlet. The fuel path and the coolant path have about the same widths where the fuel path and coolant path are closest to each other. Also, the fuel path extending between the fuel inlet and fuel outlet substantially overlies the coolant path extending between the coolant inlet and coolant outlet.

By having the fuel path width adjacent the fuel inlet be the about the same as the coolant path width and substantially overlie the coolant path width adjacent the coolant inlet, a temperature of the fuel inlet is sufficiently low so that only a minimal amount of water evaporates out of the anode water management flow field adjacent the fuel inlet. Also, by having the fuel path extending to the fuel outlet substantially overlie the coolant path extending to the coolant outlet, a temperature differential is minimized between the fuel flowing through the fuel path and the closest cooling fluid flowing through the coolant path. As the fuel flows along the fuel path overlying the coolant path and slowly warms from the heat of the cooling fluid and fuel cell, additional water moves into the anode water management flow field through osmosis of product water from the cathode flow field, through the electrolyte, anode fuel flow field and into the fuel stream and anode water management flow field. Therefore, drying out of the anode water management flow field is prevented.

In a preferred embodiment, the anode fuel flow field defines a plurality of fuel paths between the fuel inlet and fuel outlet that substantially overlie a corresponding plurality of coolant paths extending between the coolant inlet and the coolant outlet. In a further preferred embodiment, the system includes a reactant stream pressure regulating means for maintaining a positive pressure differential between the reactant streams and water within the anode water management flow field to facilitate movement of water out of the fuel flow field and into the water management flow field.

Accordingly, it is a general purpose of the present invention to provide a passive water management system for a fuel cell power plant that overcomes deficiencies of the prior art.

It is a more specific purpose to provide a passive water management system for a fuel cell power plant that prevents drying out of water management flow fields of the plant.

It is yet another purpose to provide a passive water management system for a fuel cell power plant that facilitates humidification of reactant streams entering fuel cells of the plant and removal of product water from the fuel cells.

These and other purposes and advantages of the present passive water management system for a fuel cell power plant will become more readily apparent when the following description is read in conjunction with the accompanying drawings.

DESCRIPTION OF THE PREFERRED EMBODIMENTS

Figure 1:
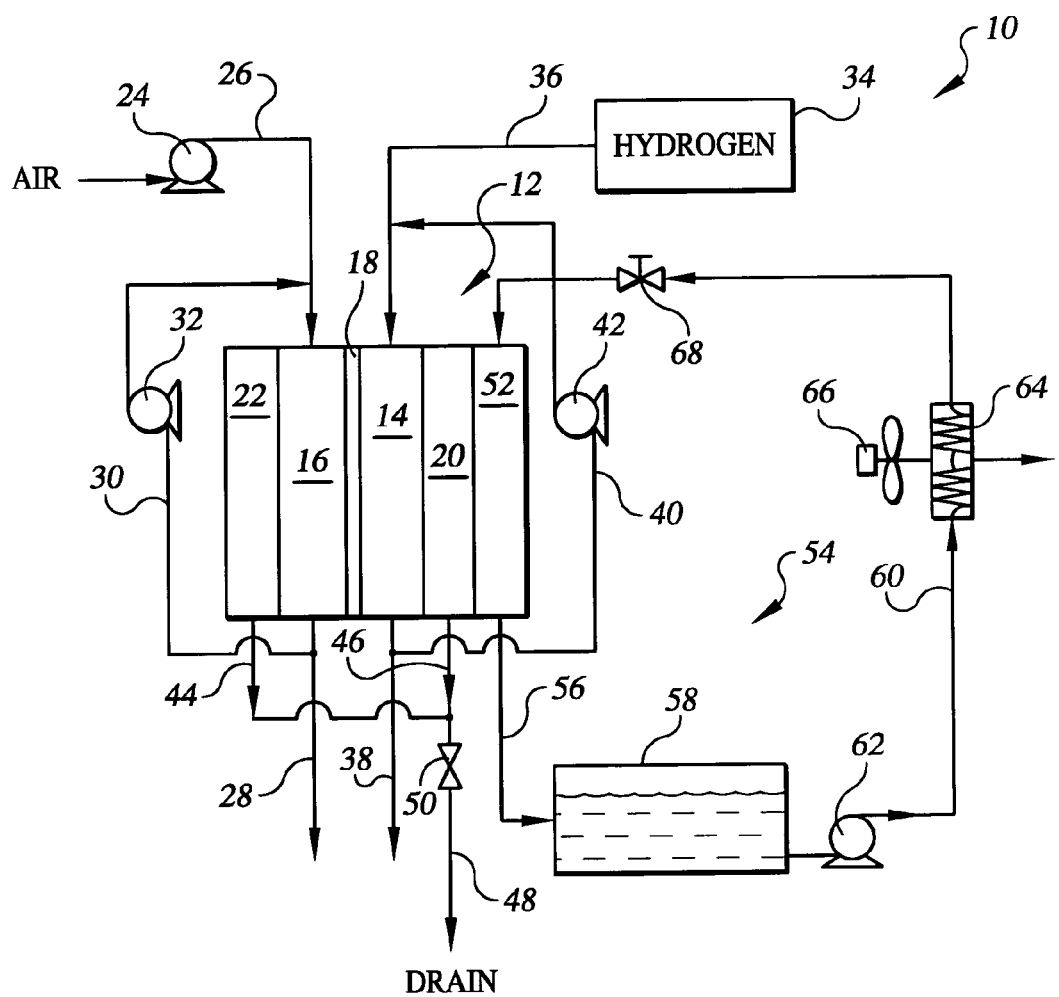
FIG. 1 is a schematic representation of a preferred embodiment of a passive water management system for a fuel cell power plant constructed in accordance with the present invention.

Referring to the drawings in detail, a passive water management system for a fuel cell power plant is shown in FIG. 1, and is generally designated by the reference numeral 10. The system 10 includes at least one fuel cell, such as a fuel cell 12 for generating electrical current from hydrogen containing reducing fluid and oxygen containing oxidant reactant streams as is known in the art. The fuel cell 12 includes an anode fuel flow field 14 and a cathode oxidant flow field 16 defined adjacent opposed sides of an electrolyte 18. The electrolyte 18 may be in the form of a well-known membrane electrode assembly including a proton exchange membrane ("PEM") of the type described in U.S. Pat. No. 6,024,848 disposed between anode and cathode catalysts (not shown). An anode water management flow field 20 is defined adjacent to and in fluid communication with the anode flow field 14. A cathode water management flow field 22 is defined adjacent to and in fluid communication with the cathode flow field 16. The water management flow fields 20, 22 may consist of layers including pores, channels or voids capable of receiving and directing flow of water.

In operation of the fuel cell 12, an oxygen containing oxidant stream, such as air, is directed through an oxidant blower 24 and oxidant inlet line 26 into the cathode flow field 16 and out of the fuel cell 12 as a cathode exhaust stream through a cathode exhaust line 28. A portion of the cathode exhaust stream may be selectively recycled back into the oxidant inlet line 26 through a cathode recycle line 30 and cathode recycle blower 32 secured to the line 30 to aid in humidifying and heating the oxidant stream entering the fuel cell 12. At the same time, a hydrogen rich reducing fluid fuel is directed from a hydrogen fuel source 34 through a fuel inlet line 36 into the anode fuel flow field 14 and out of the fuel cell 12 as an anode exhaust stream within an anode exhaust line 38. A portion of the anode exhaust stream may be selectively recycled through an anode recycle line 40 and anode recycle blower 42 into the fuel inlet line 36 to humidify and warm the fuel stream entering the fuel cell 12.

In a well known manner, the fuel is electrochemically dissociated to produce an electrical current and hydrogen ions as the fuel cell 12 operates, and the hydrogen ions combine with electrons at the cathode catalyst of the membrane electrode assembly 18 to form fuel cell product water and heat. A portion of the product water flows through the cathode oxidant flow field 16 into the cathode water management flow field 22, and through the membrane electrode assembly 18, anode fuel flow field 14 into the anode water management flow field 20. Water within the cathode water management flow field 22 may leave the fuel cell 12 through a cathode water exhaust line 44, while water within the anode water management flow field 20 may leave the fuel cell 12 through an anode water exhaust line 46. The water exhaust lines 44, 46 may join together as shown in FIG. 1 into a water drain 48 for controlled draining of the water by a water drain valve 50.

A cooler plate 52 is secured in heat exchange relationship with the fuel cell 12, such as adjacent the anode water flow management flow field 20, as shown in FIG. 1. The cooler plate 52 may be part of a coolant loop 54 for cycling a cooling fluid through the cooler plate 52. The coolant loop 52 may include a coolant discharge line 56 that directs the cooling fluid out of the cooler plate 52 into a coolant accumulator 58; a coolant feed line 60 that directs the cooling fluid from the accumulator 58 back into the cooler plate 52; a coolant pump 62 in fluid communication with the coolant inlet feed line 60 for pumping the cooling fluid through the coolant loop 54; a coolant heat exchanger 64 and heat exchanger fan 66 in fluid communication with the coolant feed line 60 for removing heat from the cooling fluid; and a coolant pressure control means, such as a pressure control valve 68 for controlling a pressure of the cooling fluid within the cooler plate 52 to be below a pressure of the reactant streams within the fuel cell 12. (An exemplary pressure control means is disclosed in commonly owned U.S. Pat. No. 6,322,915.) The cooling fluid circulating through the cooler plate 52 may be a traditional automotive antifreeze solution, or may be water. By maintaining the pressure of the cooling fluid within the cooler plate below that of the reactant streams, in the event of a leak in the cooler plate 52, the cooling fluid is unlikely to enter the flow fields 20, 14, 16, 22 to poison catalysts of the membrane electrode assembly 18.

Figure 2:
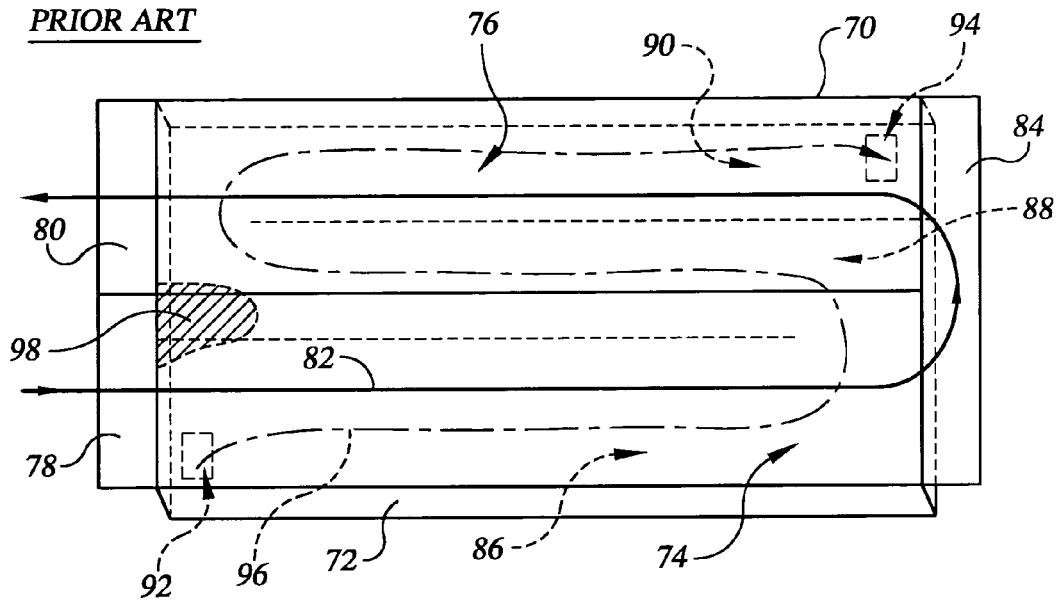
FIG. 2 is a cross-sectional, simplified, schematic view of a prior art fuel path of an anode fuel flow field overlying a prior art coolant path of a cooler plate.

Operation of prior art fuel cells utilizing cooler plates and water management flow fields has resulted in excessive loss of water from portions of an anode water management flow field. For example, and as shown in FIG. 2 showing a schematic representation of a prior art anode fuel flow field 70 overlying a prior art cooler plate 72, a first prior art fuel path 74 and a second prior art fuel path 76 extend between a prior art fuel inlet 78 and prior art fuel outlet 80. As is shown in FIG. 2, the first and second prior art fuel paths 74, 76 direct the fuel to flow according to the prior art fuel directional arrow 82 from the prior art fuel inlet 78, along the first prior art path 74 through a prior art fuel turn around 84, and along the second prior art fuel path 76 out the prior art fuel outlet 80. The prior art cooler plate 72 defines a first prior art coolant path 86, second prior art coolant path 88, and third prior art coolant path 90 extending between a prior art coolant inlet 92 and a prior art coolant outlet 94, so that a cooling fluid flows according to the prior art coolant directional arrow 96 from the coolant inlet 92 to the coolant outlet 94.

As can be seen in FIG. 2, because the prior art fuel paths 74, 76 are not the same widths as and do not overlie the prior art coolant paths 86, 88, 90, a portion of the first prior art fuel path 74 overlies a portion of the second prior art coolant path 88. It has been determined by the inventor herein, that whenever a fuel stream passing through the prior art fuel inlet 78 into the first prior art fuel path 74 has a relative humidity with respect to a temperature of the prior art fuel inlet 78 that less than about seventy-five percent, unacceptable evaporation of water into the fuel stream takes place within the first prior art fuel path 74 adjacent the prior art fuel inlet 78 and adjacent a portion of the second prior art coolant path 88 that is adjacent the prior art fuel inlet 78. For purposes herein, the referenced "relative humidity" means a partial pressure of water at the dew point of the fuel stream divided by a partial pressure of water at the temperature of the prior art fuel inlet 78. This effectively creates what may be characterized as an evaporation zone 98 (shown in FIG. 2) within the prior art anode fuel flow field 70 that may cause drying out of adjacent layers of a prior art fuel cell and layers in fluid communication with the evaporation zone 98, such as an adjacent anode water management flow field, PEM electrolyte in fluid communication with the evaporation zone, etc.

When the cooling fluid passing through the prior art cooler plate 72 has passed from the prior art coolant inlet 92 to the portion of the second prior art coolant path 88 adjacent to the prior art fuel inlet 78, the cooling fluid has acquired substantial heat so that the cooling fluid transfers heat into the fuel flowing through the prior art fuel inlet 78. The heated fuel may therefore absorb more water than cooler fuel passing through the prior art fuel inlet 78 and over the first prior art coolant path 86, resulting in the evaporation zone 98.

Figure 3:
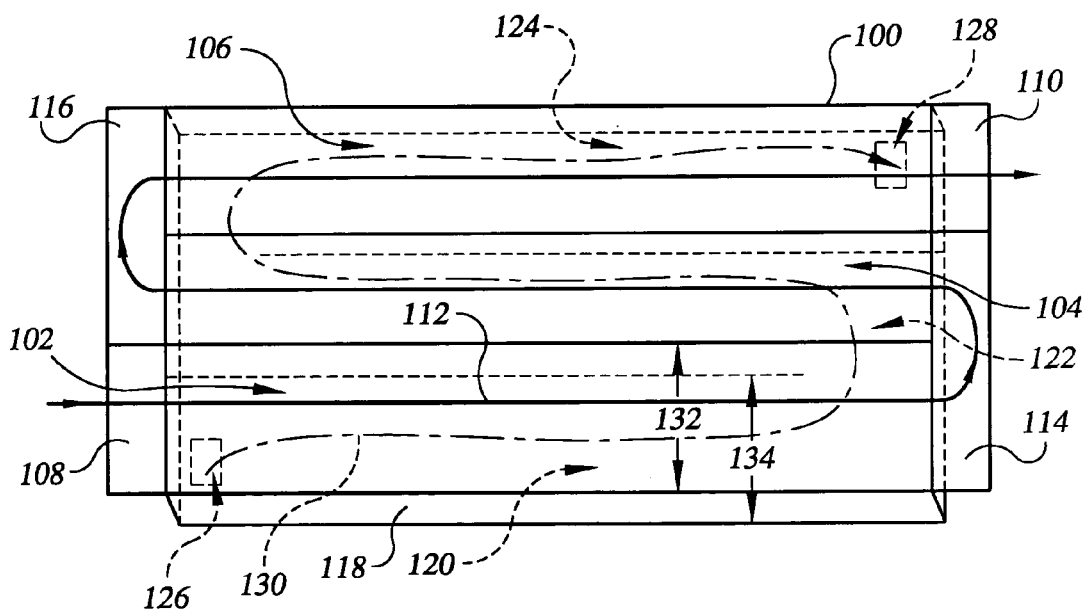
FIG. 3 is a cross-sectional, simplified, schematic view of a fuel path of an anode fuel flow field overlying a coolant path of a cooler plate incorporating the present invention.

The present invention solves the problem of excessive evaporation into a fuel stream of the prior art by changing the relationship of the prior art fuel paths 74, 76 and prior art coolant paths 86, 88, 90. As shown in FIG. 3, an anode fuel flow field 100 of the present invention includes a first fuel path 102, a second fuel path 104, and a third fuel path 106 defined between a fuel inlet 108 and a fuel outlet 110. The fuel stream flows from the fuel inlet 108 along the fuel paths 102, 104, 106 in the direction of a fuel directional arrow 112 through a first fuel turn around 114, a second fuel turn around 116 and into the fuel outlet 110, as shown in FIG. 3. A cooler plate 118 of the present invention (shown in hatched lines in FIG. 3) includes a first coolant path 120, a second coolant path 122 and a third coolant path 124 defined between a coolant inlet 126 and a coolant outlet 128. A stream of cooling fluid therefore flows from the coolant inlet 126 in the direction of the coolant directional arrow 130 (a hatched line in FIG. 3) along the coolant paths 120, 122, 124 to the coolant outlet 128. The fuel paths 102, 104, 106 and coolant paths 120, 122, 124 may be defined as channels within solid or porous plates or within known layers or plates of fuel cells permitting fluid flow, such as the fuel paths 102, 104, 106 being channels defined in a porous plate comprising the anode flow field 14 of the FIG. 1 fuel cell, and the coolant paths 120, 122, 124 being channels defined in an exterior surface of the cooler plate 52 shown in FIG. 1.

A fuel path width is defined as being a shortest distance between boundaries defining a fuel path 102, 104, 106, such as represented at reference numeral 132 for the first fuel path 102, wherein the fuel path width 132 is a shortest distance across the first fuel path 102 in a direction perpendicular to flow of the fuel stream in the direction of the fuel directional arrow 112 through the first fuel path 102. Similarly, a coolant path width is defined as a shortest distance across a coolant path 120, 122, 124 in a direction perpendicular to flow of the cooling fluid in the direction of the coolant directional arrow 130, such as represented at reference numeral 134 for the first coolant path 120.

The width of the fuel path 132 is about the same as the width of the coolant path 134 where the fuel paths and coolant paths are closest to each other. For example, and as shown in FIG. 3 at reference numerals 132 and 134, where the fuel path is closest to the coolant path, the widths are about the same. The phrase "about the same" means that a measurement of a width of a fuel path is the same plus or minus twenty percent as a measurement of a width of a coolant path. In particular, the width of the first fuel path 102 adjacent the fuel inlet 108 is about the same as the width of the first coolant path 120 adjacent the coolant inlet 126. It is stressed again, that the first coolant path 120 is defined as a channel permitting fluid flow, and is not the same as the coolant inlet 126 that may be a void defined within the first coolant path 120 as represented in FIG. 3. The width of the third fuel path 106 adjacent the coolant outlet 128 is also preferably about the same as the width of the third coolant path 124 adjacent the coolant outlet 128.

By the phrase "the width of the fuel path 132 is about the same as the width of the coolant path 134 where the fuel path and coolant path are closet to each other" is meant to describe a width measurement at a point along the fuel paths 102, 104, 106 and a corresponding width measurement at a point along the coolant paths 120, 122, 126 that is closet to the point of measurement of the width of the fuel path, but not including the fuel turn arounds 114, 116, and not including points in the coolant paths 120, 122, 124 wherein the flow of the cooling fluid is reversing direction, for example between the first coolant path 120 and the second coolant path 122. Such a characterization anticipates that the fuel paths 102, 104 106 and coolant paths 120, 122, 124 may not be the same widths between their respective inlets and outlets. For example, the first fuel path 102 may be a different width adjacent the fuel inlet 108 than is the third fuel path 106 adjacent the fuel outlet 110. However, the first coolant path 120 adjacent the fuel inlet 110 is about the same width as the first fuel path 102 closest to that point of the first coolant path 120, and the third coolant path 124 is about the same width as the third fuel path 106 closest to that point of the third coolant path 124.

By having the fuel paths 102, 104, 106 and the coolant paths 120, 122, 124 be about the same widths where the fuel paths and coolant paths are closest to each other, a temperature differential is minimized between the fuel flowing through the fuel paths 102, 104 106 and the closest cooling fluid flowing through the coolant paths 120, 122, 126. By having the temperature differential minimized, especially adjacent the fuel inlet 108, evaporation of water out of adjacent layers into the fuel stream is minimized.

The fuel paths 102, 104, 106 extending between the fuel inlet 108 and the fuel outlet 110 also substantially overlie the coolant paths 120, 122, 124 extending between the coolant inlet 126 and the coolant outlet 128. By the phrase "the fuel paths 102, 104, 106 . . . substantially overlie the coolant paths 120, 122, 124", it is meant that an axis that is both perpendicular to the flow of the fuel within a fuel path 102, 104, 106 and that is also perpendicular to the above defined width of a fuel path 102, 104, 106 necessarily passes through a closest point on a coolant path 120, 122, 124. The requirement of the fuel paths substantially overlying the coolant paths combined with the fuel and coolant paths being about the same widths insures that the most direct heat exchange relationship will exist between the fuel paths 102, 104, 106 and the coolant paths 120, 122, 124. While the fuel paths 102, 104, 106 may have the same widths as closest coolant paths 122, 124, 126, requiring that the fuel paths between the fuel inlet 108 and the fuel outlet 110 also overlie the coolant paths 120, 122, 124 between the coolant inlet 126 and coolant outlet 128 insures that there will be a heat exchange relationship between the fuel and coolant paths from their respective inlets 108, 126 to their outlets 110, 128. By the word "substantially", it is meant that a shortest measurement between boundaries defining the fuel paths 102, 104, 106 may be the same measurement plus or minus twenty percent as a shortest measurement between boundaries defining the coolant paths 122, 124, 126. Therefore, the fuel paths 102, 104, 106 do not have to precisely overlie, but only substantially overlie the coolant paths 122, 124, 126.

By use of the words "inlet" and "outlet" it is also meant that the flow of fuel through the fuel paths 102, 104, 106 from the fuel inlet 108 to the fuel outlet 110 is in the same direction as flow of cooling fluid through the coolant paths 120, 122, 124 from the coolant inlet 126 to the coolant outlet 128 as further indicated by the fuel directional arrow 112 and the coolant directional arrow 130. The present passive water management system for a fuel cell power plant 10 also includes embodiments wherein a single fuel path extends between a fuel inlet and outlet and is about the same width as and substantially overlies a single coolant path extending between a coolant inlet and coolant outlet (not shown), as well as a plurality of fuel paths of about the same width as and substantially overlying a corresponding plurality of coolant paths (not shown) beyond the above described three fuel and coolant paths extending between fuel and coolant inlets and outlets.

It can be seen that the present passive water management system for a fuel cell power plant 10 provides for removal of product water, humidification of reactant streams and prevention of drying out of flow fields 20, 22 and/or electrolyte 18 layers in an efficient, passive manner without use of costly partial seals of water management flow fields 20, 22, and/or energy dependent active movement of water to alleviate excessive evaporation or provide adequate humidification of reactant streams.

All of the aforementioned U.S. Patents are incorporated herein by reference.

While the present invention has been disclosed with respect to the described and illustrated embodiments, it is to be understood that the invention is not to be limited to those embodiments. Accordingly, reference should be made primarily to the following claims rather than the foregoing description to determine the scope of the invention.

What is claimed is:

1. A passive water management system for a fuel cell power plant (10), the system comprising:
    a. at least one fuel cell (12) for generating electrical current from hydrogen containing reducing fluid fuel and oxygen containing oxidant reactant streams, the fuel cell (12) including an anode fuel flow field (14), and a cathode oxidant flow field (16) defined adjacent opposed sides of an electrolyte (18), an anode water management flow field (20) defined adjacent the anode fuel flow field (14), the anode fuel flow field (14) (100) including at least one fuel path (102) defined between a fuel inlet (108) and a fuel outlet (110) for directing the fuel to flow adjacent to the electrolyte (18) from the fuel inlet (108) through the fuel path (102) to the fuel outlet (110);
    b. a cooler plate (52) secured in heat exchange relationship with the fuel cell (12) for removing heat from the fuel cell (12), the cooler plate (52) (118) including at least one coolant path (120) defined between a coolant inlet (126) and a coolant outlet (128) for directing a cooling fluid to flow from the coolant inlet (126) through the coolant path (102) to the coolant outlet (128); and,
    c. wherein a width (132) of the fuel path (102) is about the same as a width (134) of the coolant path (120) where the fuel path (102) and coolant path (120) are closest to each other, and the fuel path (102) extending between the fuel inlet (108) and the fuel outlet (110) substantially overlies the coolant path (120) extending between the coolant inlet (126) and the coolant outlet (128) to minimize a temperature differential between fuel flowing through the fuel path (102) and the closest cooling fluid flowing through the coolant path (120).

2. The system of claim 1, further comprising a plurality of fuel paths (102) extending between the fuel inlet (108) and the fuel outlet (110) of about the same width as and substantially overlying a corresponding plurality of coolant paths (120) extending between the coolant inlet (126) and the coolant outlet (128).

3. The system of claim 1, further comprising a coolant loop (54) for circulating a cooling fluid through the cooler plate (52), the coolant loop including a pressure control means (68) for controlling a pressure of the cooling fluid within the cooler plate (52) to be below a pressure of the reactant streams within the anode fuel flow field (14) and cathode oxidant flow field (16) of the fuel cell (12).

* * * * *